US011505223B2

(12) United States Patent
Kobayashi et al.

(10) Patent No.: US 11,505,223 B2
(45) Date of Patent: Nov. 22, 2022

(54) TRAIN POSITION DETECTION APPARATUS AND METHOD

(71) Applicants:Kabushiki Kaisha Toshiba, Minato-ku (JP); Toshiba Infrastructure Systems & Solutions Corporation, Kawasaki (JP)

(72) Inventors: Hiroyuki Kobayashi, Tsukubamirai (JP); Hideaki Nameki, Mitaka (JP); Naoto Seto, Kawasaki (JP); Yushi Kamo, Kawasaki (JP); Susu Jiang, Kawasaki (JP); Yohei Hattori, Koto (JP)

(73) Assignees: Kabushiki Kaisha Toshiba, Tokyo (JP); Toshiba Infrastructure Systems & Solutions Corporation, Kawasaki (JP)

( * ) Notice: Subject to any disclaimer, the term of this patent is extended or adjusted under 35 U.S.C. 154(b) by 846 days.

(21) Appl. No.: 16/325,813

(22) PCT Filed: Aug. 18, 2017

(86) PCT No.: PCT/JP2017/029633
§ 371 (c)(1),
(2) Date: Feb. 15, 2019

(87) PCT Pub. No.: WO2018/034341
PCT Pub. Date: Feb. 22, 2018

(65) Prior Publication Data
US 2019/0185033 A1   Jun. 20, 2019

(30) Foreign Application Priority Data
Aug. 19, 2016   (JP) .............................. JP2016-161468

(51) Int. Cl.
*B61L 3/12*   (2006.01)
*G01S 19/49*   (2010.01)
(Continued)

(52) U.S. Cl.
CPC .................. *B61L 3/12* (2013.01); *G01S 5/02* (2013.01); *G01S 19/40* (2013.01); *G01S 19/49* (2013.01); *G01S 19/50* (2013.01)

(58) Field of Classification Search
CPC ... B61L 3/12; G01S 5/02; G01S 19/40; G01S 19/49; G01S 19/50
See application file for complete search history.

(56) References Cited

U.S. PATENT DOCUMENTS 5,867,122 A   2/1999   Zahm et al.
8,296,065 B2   10/2012   Haynie et al.
(Continued)

FOREIGN PATENT DOCUMENTS

CN   103221291 A   7/2013
EP   1 785 333 A1   5/2007
(Continued)

OTHER PUBLICATIONS

International Search Report dated Nov. 7, 2017 in PCT/JP2017/029633 filed on Aug. 18, 2017.

*Primary Examiner* — Dao L Phan
(74) *Attorney, Agent, or Firm* — Maier & Maier, PLLC (57) ABSTRACT

A train position detection apparatus is configured to detect a position of a train by receiving positioning radio waves from satellites through a reception antenna. The train position detection apparatus includes: a memory that stores therein in advance a railway design standard of a railway track on which the train travels; and one or more hardware processors that detect a position of the train by self-contained navigation based on an input signal from a self-contained naviga-
(Continued)

tion sensor. When a result of the train position detection based on the positioning radio waves does not satisfy the railway design standard, the one or more hardware processors correct the result of the train position detection based on the positioning radio waves with a result of the position detection by self-contained navigation.

6 Claims, 5 Drawing Sheets

(51) Int. Cl.
    *G01S 19/50*    (2010.01)
    *G01S 5/02*     (2010.01)
    *G01S 19/40*    (2010.01)

(56)  References Cited

U.S. PATENT DOCUMENTS

2010/0312461 A1    12/2010  Haynie et al.
2013/0112815 A1*    5/2013  Tokumaru ............. B61L 25/025
                                                       246/124
2018/0009454 A1*    1/2018  Katsuragi ............... G01S 19/48
2021/0001902 A1*    1/2021  Tsutsumi .............. B61L 25/025

FOREIGN PATENT DOCUMENTS

| | | |
|---|---|---|
| JP | 9-198360 A | 7/1997 |
| JP | 2001-10524 A | 1/2001 |
| JP | 2003-294825 A | 10/2003 |
| JP | 2004-271255 A | 9/2004 |
| JP | 2005-247042 A | 9/2005 |
| JP | 2005-292912 A | 10/2005 |
| JP | 2006-69306 A | 3/2006 |
| JP | 2008-247245 A | 10/2008 |
| JP | 2010-163118 A | 7/2010 |
| JP | 2012-208033 A | 10/2012 |
| JP | 5244490 B2 | 7/2013 |
| JP | 2015-76065 A | 4/2015 |
| WO | 2012/007822 A1 | 1/2012 |

* cited by examiner

TRAIN POSITION DETECTION APPARATUS AND METHOD

CROSS-REFERENCE TO RELATED APPLICATIONS

This application is national stage application of International Application No. PCT/JP2017/029633, filed Aug. 18, 2017, which designates the United States, incorporated herein by reference, and which claims the benefit of priority from Japanese Patent Application No. 2016-161468, filed Aug. 19, 2016, the entire contents of which are incorporated herein by reference.

FIELD

Embodiments described herein relate generally to a train position detection apparatus and a method.

BACKGROUND

When a position sensing system for sensing a train position by using a global navigation satellite system (GNSS) is installed in a railway vehicle, a GNSS reception antenna, which has not mounted at authentication of the vehicle, cannot be mounted on a roof of the vehicle.

Thus, when the position sensing system is introduced after authentication of the vehicle, the antenna should be installed at an indoor place, and satellites cannot be surely tracked due to an obstacle such as the roof.

As a result, the reception state of radio waves degrades, and the positioning accuracy often decreases due to an insufficient number of satellites and the influence of reflected wave. Since stations usually have roofs, the accuracy of positioning using satellites degrades in many cases.

DETAILED DESCRIPTION

According to one embodiment, a train position detection apparatus is configured to detect a position of a train by receiving positioning radio waves from satellites through a reception antenna. The train position detection apparatus includes: a memory that stores therein in advance a railway design standard of a railway track on which the train travels; and one or more hardware processors that detect a position of the train by self-contained navigation based on an input signal from a self-contained navigation sensor. When a result of the train position detection based on the positioning radio waves does not satisfy the railway design standard, the one or more hardware processors correct the result of the train position detection based on the positioning radio waves with a result of the position detection by self-contained navigation.

An embodiment will be described below with reference to the accompanying drawings.

1. Embodiment

Figure 1:
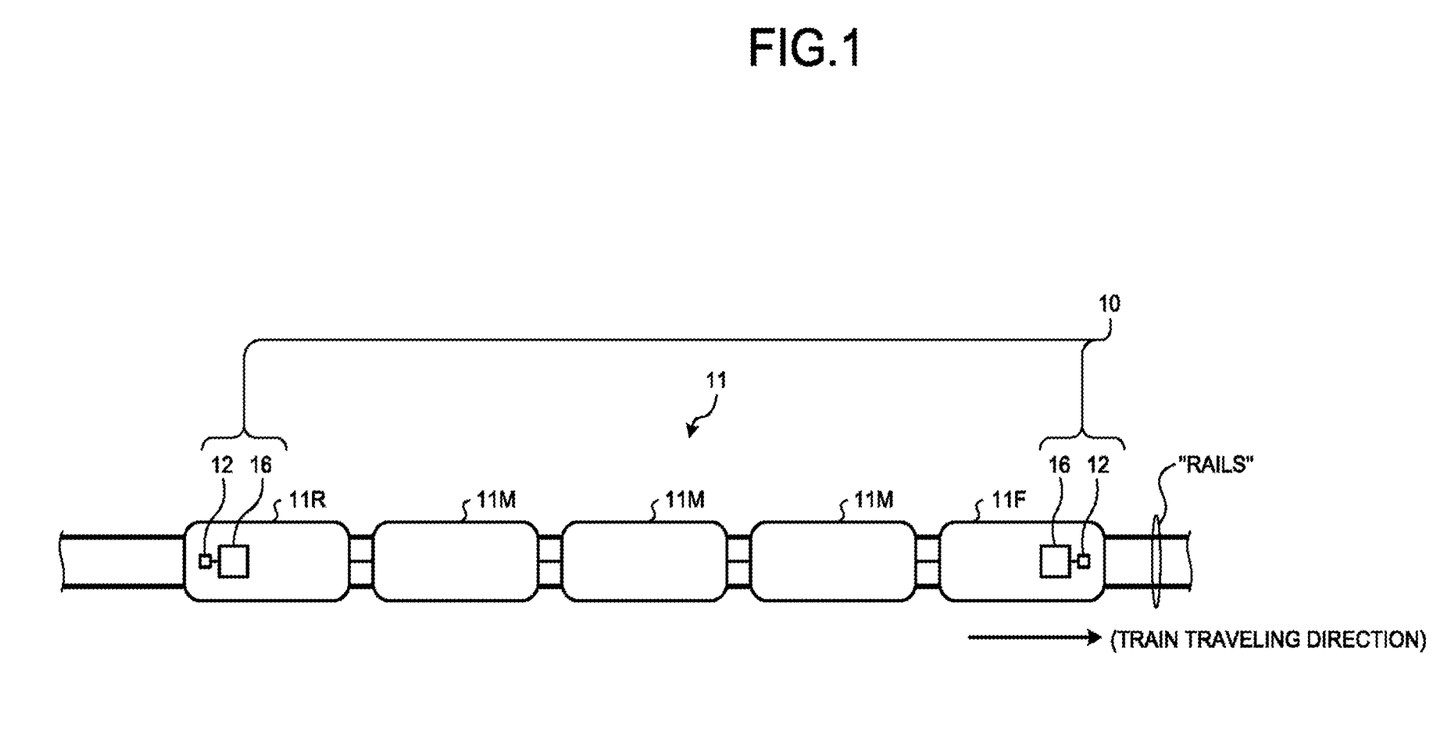
FIG. 1 is an outline configuration block diagram (plan view) of a train position detection system according to an embodiment.

FIG. 1 is an outline configuration block diagram (plan view) of a train position detection system according to an embodiment.

The train position detection system 10 is disposed at a front-end vehicle 11F and a rear-end vehicle 11R of a train 11. The train position detection system 10 includes a GNSS reception antenna 12 configured to output a global navigation satellite system (GNSS) positioning signal corresponding to positioning radio wave, and a train position detection apparatus 16 configured to perform position calculation based on a GNSS positioning signal, a direction signal, an acceleration signal, an azimuth signal, and a posture signal as input signals to be described later.

The train 11 includes middle vehicles 11M.

Figure 2:
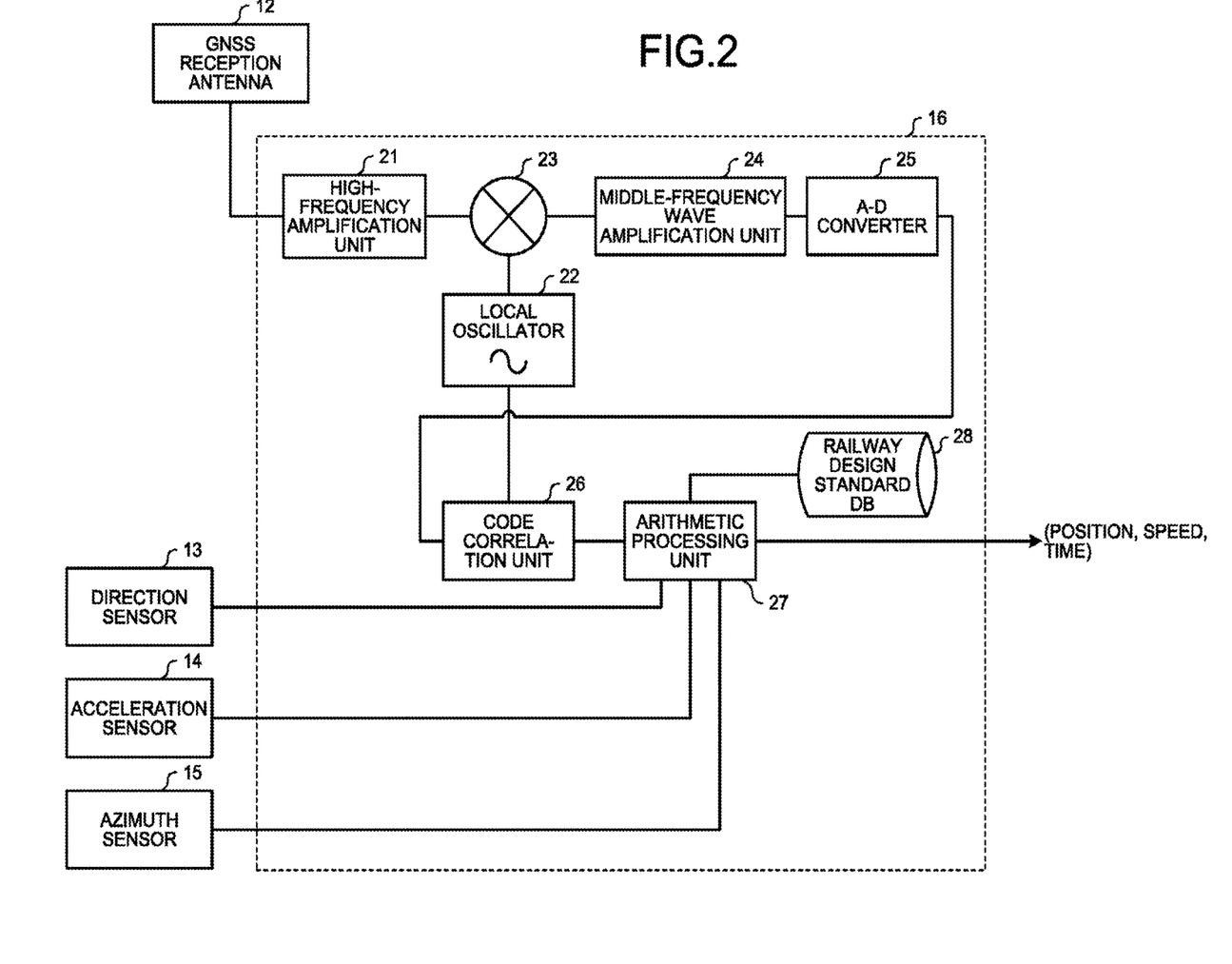
FIG. 2 is an outline configuration block diagram of a train position detection apparatus.

FIG. 2 is an outline configuration block diagram of the train position detection apparatus.

As illustrated in FIG. 2, the train position detection apparatus 16 is connected with a direction sensor 13, an acceleration sensor 14, and an azimuth sensor 15. The direction sensor 13 is achieved by a gyro sensor or the like and configured to detect the moving direction of the train 11 and output a direction signal. The acceleration sensor 14 is configured to detect the acceleration of the train 11 and output an acceleration signal. The azimuth sensor 15 is achieved by a geomagnetic sensor or the like and configured to detect the azimuth of the train 11 or the posture (tilt) of the train 11 and output an azimuth signal or a posture signal.

The train position detection apparatus 16 includes: a high-frequency amplification unit 21 configured to perform high-frequency amplification of a GNSS positioning signal input through the GNSS reception antenna 12; a mixer 23 configured to perform conversion into a middle-frequency signal through mixture with a local oscillation frequency generated by a local oscillator 22; a middle-frequency wave amplification unit 24 configured to amplify the middle-frequency signal output from the mixer 23; an A-D converter 25 configured to perform analog-digital conversion of the amplified middle-frequency signal output from the middle-frequency wave amplification unit 24; and a code correlation unit 26 configured to demodulate a C/A code based on output data from the A-D converter 25 and control the local oscillator 22.

In addition, the train position detection apparatus 16 includes an arithmetic processing unit 27 and a railway design standard database (DB) 28. The arithmetic processing unit 27 demodulates navigation message data from the C/A code demodulated by the code correlation unit 26, determines the position of the GNSS reception antenna 12, in other words, the position, speed, and time of the front-end vehicle 11F of the train 11 or position, speed, and time of the rear-end vehicle 11R by calculating the orbit and position of each satellite, determines the position, speed, azimuth, and vehicle tilt of the front-end vehicle 11F of the train 11, or the position, speed, azimuth, and vehicle tilt of the rear-end vehicle 11R based on input direction data, acceleration data, azimuth data, and posture data, and notifies a train control device of the above-listed data through a communication line. The railway design standard database 28 stores therein in advance a railway track design standard as a database.

The following describes a method of selecting satellites that transmits positioning radio waves used by the train position detection apparatus 16 to detect a position of the train 11.

The train position detection system 10 is premised to be additionally installed in the front-end vehicle 11F and the rear-end vehicle 11R of the train 11 afterward. The GNSS reception antenna 12 is installed, for example, around a cab provided to each of the front-end vehicle 11F and the rear-end vehicle 11R (for example, near the front window).

As illustrated in FIG. 1, in the train 11 proceeding in a train traveling direction, a positioning radio wave from the front side in the traveling direction (illustrated with an arrow in FIG. 1) to the GNSS reception antenna 12 installed around the cab of the front-end vehicle 11F is received as a direct wave. However, a reflected wave of the satellite signal is more likely to be received in directions (right and left directions of the vehicle, in particular) other than the front side of the front-end vehicle 11F in the traveling direction.

In a case of a train, no curve has an abruptly bending curvature, and thus obstacles are less likely to exist ahead a railway track.

Even if a railway track has a relatively small clearance in the right and left direction, no problems occur on a train traveling on the railway track, however, positioning radio waves are highly likely to be incident through reflection at buildings and walls positioned near the railway track.

For those reasons, in the present embodiment, position detection is selectively performed only with a satellite from which a direct wave can be received.

Figure 3:
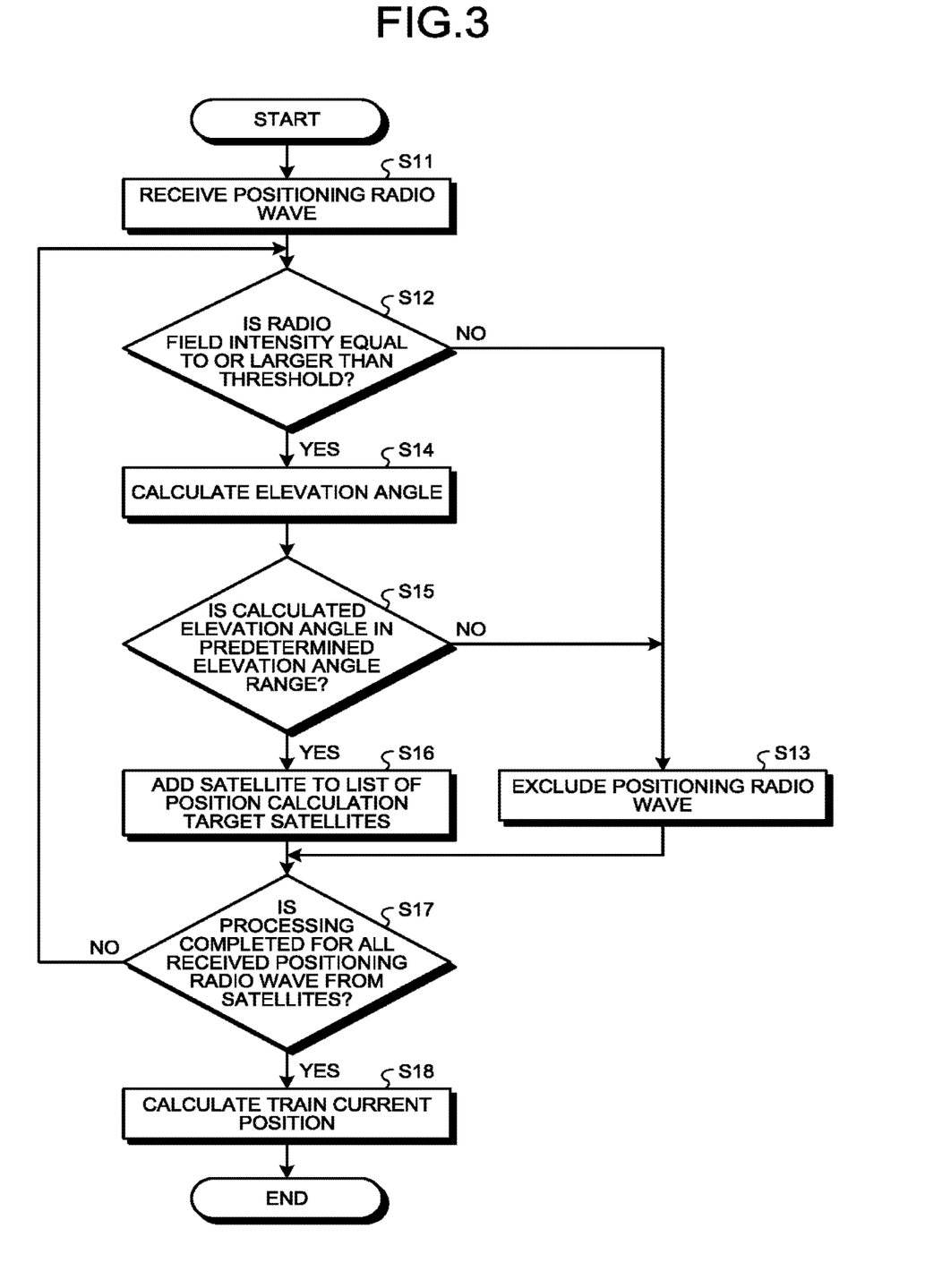
FIG. 3 is a flowchart of GNSS positioning signal processing performed by the train position detection apparatus.

FIG. 3 is a flowchart of GNSS positioning signal processing performed by the train position detection apparatus.

First, the train position detection apparatus 16 receives a positioning radio wave from each satellite through the GNSS reception antenna 12 (step S11).

The arithmetic processing unit 27 of the train position detection apparatus 16 determines the radio field intensity of the positioning radio wave for each satellite, and determines whether the radio field intensity is equal to or larger than a predetermined radio field intensity threshold in order to determine whether the radio field intensity is sufficient to be used for position calculation (step S12).

In the determination at step S12, when the radio field intensity is smaller than the predetermined radio field intensity threshold (No at step S12), the arithmetic processing unit 27 determines that the positioning radio wave from the satellite is not suitable for position measurement, and excludes the positioning radio wave (step S13).

In the determination at step S12, when the positioning radio wave is equal to or larger than the predetermined radio field intensity threshold (Yes at step S12), the arithmetic processing unit 27 calculates an approximate elevation angle of the satellite at the current position based on almanac data included in the positioning radio wave (step S14).

Subsequently, the arithmetic processing unit 27 of the train position detection apparatus 16 determines whether the calculated elevation angle is within a predetermined elevation angle range indicating that the satellite can be set as a position calculation target (step S15).

Figure 4:
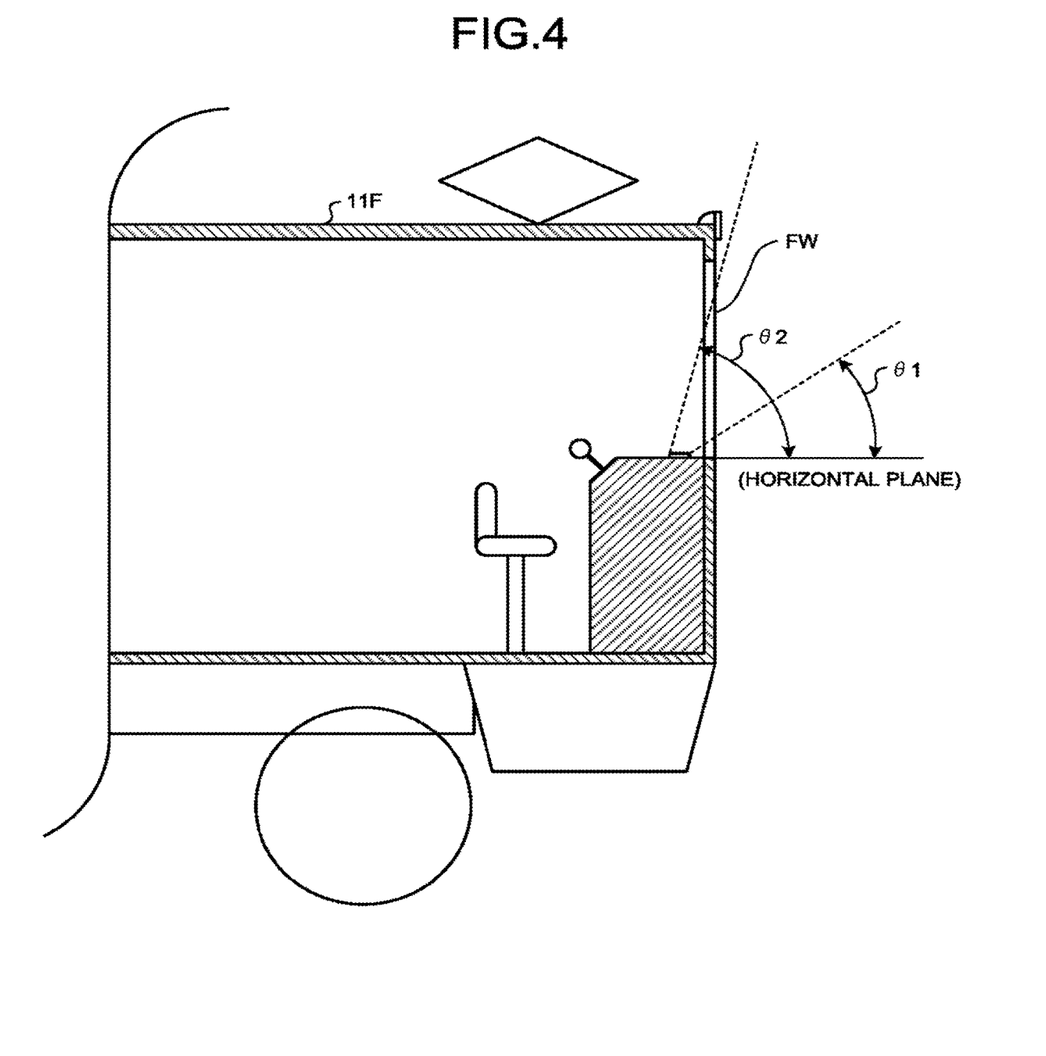
FIG. 4 is an explanatory diagram of elevation angle range setting.

FIG. 4 is an explanatory diagram of elevation angle range setting.

A minimum the elevation angle $\theta 1$ is set because the positioning accuracy is highly likely to decrease when the elevation angle relative to the GNSS reception antenna 12 installed in an operating room of the vehicle is too small (too close to the horizontal line) as illustrated in FIG. 4. In addition, a maximum elevation angle $\theta 2$ is set in accordance with the opening of a front window (window glass on the front side of the cab) FW. Accordingly, the positioning radio wave from a satellite having an elevation angle between the minimum elevation angle $\theta 1$ and the maximum elevation angle $\theta 2$ is set as the position calculation target.

In the determination at step S15, when the calculated elevation angle is out of the predetermined elevation angle range indicating that the satellite can be set as the position calculation target (No at step S15), the arithmetic processing unit 27 determines that the positioning radio wave from the satellite is not suitable for position measurement, and excludes the positioning radio wave (step S13). The process transitions to step S17.

In the determination at step S15, when the calculated elevation angle is within the predetermined elevation angle range indicating that the satellite can be set as the position calculation target (Yes at step S15), the arithmetic processing unit 27 determines that the positioning radio wave from the satellite is suitable for position measurement, and adds the satellite to a list of position calculation target satellites in association with positioning data (for example, the radio field intensity) (step S16).

Subsequently, the arithmetic processing unit 27 determines whether the processing is completed for GNSS positioning signals corresponding to all received positioning radio wave from satellites (step S17).

In the determination at step S17, when the processing is yet to be completed for the GNSS positioning signals corresponding to all received positioning radio waves from satellites (No at step S17), the process transitions to step S12, and the arithmetic processing unit 27 repeats the same processing.

In the determination at step S17, when the processing is completed for the GNSS positioning signals corresponding to all received positioning radio waves from satellites (Yes at step S17), the arithmetic processing unit 27 calculates the current position of the train by using the GNSS positioning signal corresponding to the positioning radio wave from each satellite added to the list of position calculation target satellites (step S18).

Specifically, the arithmetic processing unit 27 of the train position detection apparatus 16 provided in the operating room of the front-end vehicle 11F calculates the current position of the front-end vehicle 11F by using the GNSS positioning signals, and the arithmetic processing unit 27 of the train position detection apparatus 16 provided in the operating room of the rear-end vehicle 11R calculates the current position of the rear-end vehicle 11R by using the GNSS positioning signals.

The GNSS positioning radio wave is not necessarily always stably received, depending on the surrounding environment as described above.

In railway, a design standard is defined for track installation based on the width (gauge) between wheels and the travel speed of a train.

Specifically, the defined railway design standard includes a minimum curve radius (based on a design maximum speed, and whether the railway track is a main track, a curve with a railroad switch, or a curve along the platform at a station), a relaxation curve, a slack, a cant, and a slope.

Since the railway design standard is different depending on the travel speed of a vehicle (train) 11, the railway design standard to be referred to is different in accordance with the detected travel speed of the vehicle 11.

Thus, in the present embodiment, it is determined whether the movement locus of the vehicle 11 obtained by using the GNSS positioning signals deviates from information obtained according to the railway design standard, in other words, whether the movement locus is possible according to the railway design standard. When the movement locus of the own-vehicle obtained based on the GNSS positioning signals is a movement locus not assumed according to the railway design standard, it is determined that the accuracy of position calculation has decreased, and an own-vehicle position obtained based on the GNSS positioning signals is corrected with an own-vehicle position based on self-contained navigation.

Figure 5:
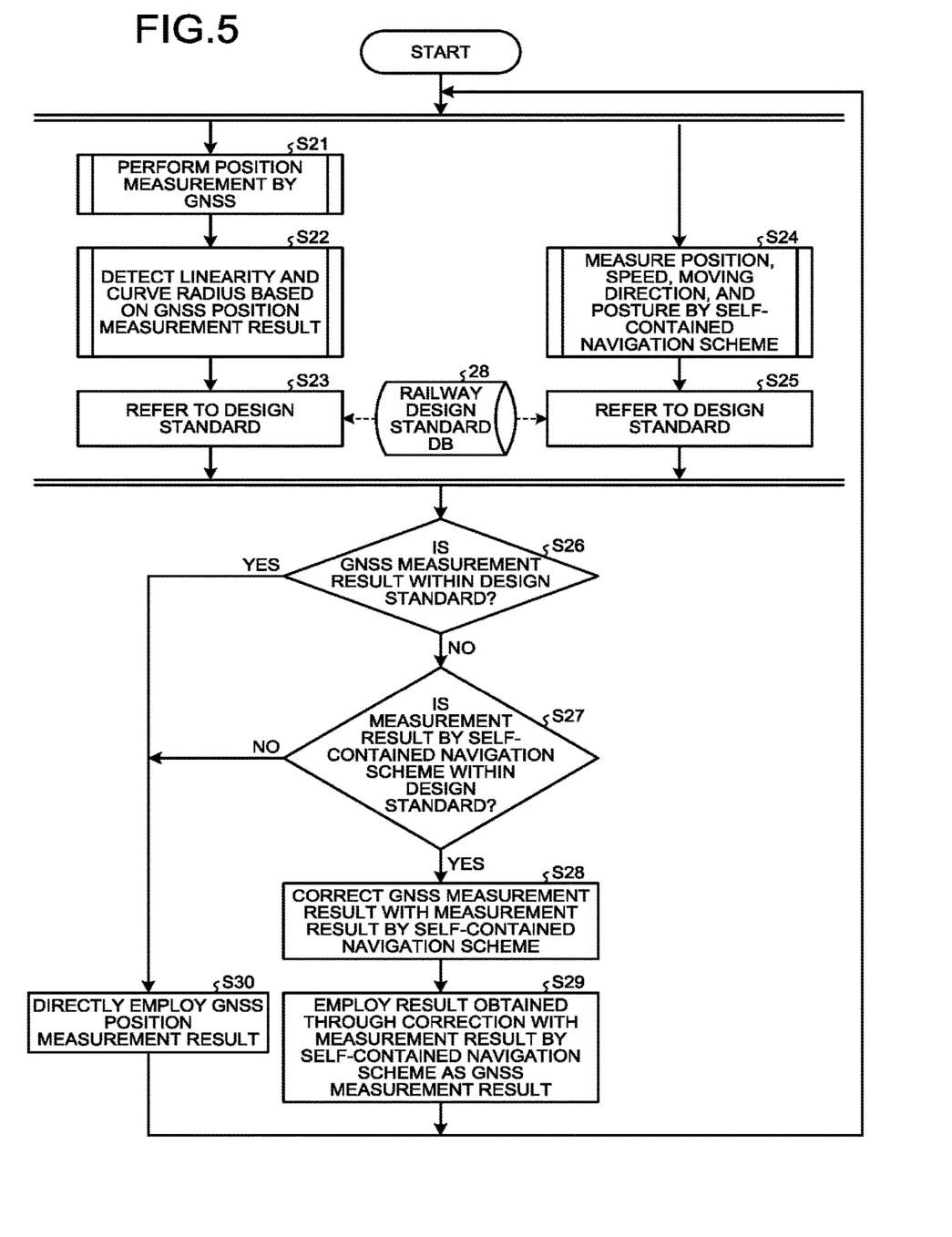
FIG. 5 is a flowchart of the entire processing performed by an arithmetic processing unit.

FIG. 5 is a flowchart of the entire processing performed by the arithmetic processing unit.

The following describes an operation according to the embodiment with reference to FIG. 5.

First, the arithmetic processing unit 27 performs position measurement by using GNSS positioning signals input through the GNSS reception antenna 12 in accordance with the flowchart of GNSS positioning signal processing illustrated in FIG. 3, and calculates the current position of the train (step S21).

Then, the current positions, which are sequentially calculated in this manner, are stored as movement locus data.

Subsequently, the arithmetic processing unit 27 detects the linearity and curve radius of the movement locus of the vehicle 11 based on the movement locus data obtained from the GNSS positioning signals (step S22).

Subsequently, the arithmetic processing unit 27 refers to the railway design standard database 28 for the movement locus data obtained from the GNSS positioning signals (step S23).

Simultaneously with the above-described processing at steps S21 to S23, the arithmetic processing unit 27 measures the position, speed, moving direction, and posture of the vehicle 11 by a self-contained navigation scheme based on input direction data, acceleration data, azimuth data, and posture data (step S24).

Subsequently, the arithmetic processing unit 27 calculates movement locus data based on the input direction data, acceleration data, azimuth data, and posture data, and refers to the railway design standard database 28 for the calculated movement locus data (step S25).

Accordingly, the arithmetic processing unit 27 determines, based on a result of the referring at step S23, whether the movement locus data obtained from the GNSS positioning signals is within the railway design standard, in other words, the movement locus data satisfies the railway design standard (step S26).

Specifically, it is determined, for example, whether the curve radius satisfies the minimum curve radius in accordance with the speed of the vehicle 11, and whether a railway track corresponding to a relaxation curve satisfies a predetermined railway design standard.

In the determination at step S26, when the movement locus data obtained from the GNSS positioning signals is within the railway design standard (Yes at step S26), the arithmetic processing unit 27 employs a position measurement result obtained from the GNSS positioning signals as is (step S30).

Then, the process transitions to step S21 or S24 again, and the arithmetic processing unit 27 repeats the position measurement processing.

In the determination at step S26, when the movement locus data obtained from the GNSS positioning signals is out of the railway design standard, in other words, does not satisfy the railway design standard (No at step S26), the arithmetic processing unit 27 determines whether movement locus data as a result of position, speed, moving direction, and posture measurement obtained by the self-contained navigation scheme through the processing at step S24 is within the railway design standard, in other words, the movement locus data satisfies the railway design standard (step S27).

Specifically, the arithmetic processing unit 27 determines, for example, whether the curve radius satisfies the minimum curve radius in accordance with the speed of the vehicle 11, whether a railway track corresponding to a relaxation curve satisfies a predetermined railway design standard, whether a cant corresponding to a curve is provided, and whether a slope that satisfies a predetermined railway design standard is detected.

In the determination at step S27, when the movement locus data as the result of position, speed, moving direction, and posture measurement by the self-contained navigation scheme obtained through the processing at step S24 is out of the railway design standard, in other words, does not satisfy the railway design standard (No at step S27), the arithmetic processing unit 27 employs the position measurement result obtained from the GNSS positioning signals as is because it is conceivable that the GNSS position measurement result has higher reliability than the position measurement result by the self-contained navigation scheme (step S30).

Then, the process transitions to step S21 or S24 again, and the arithmetic processing unit 27 repeats the position measurement processing.

In the determination at step S27, when the movement locus data as the result of position, speed, moving direction, and posture measurement by the self-contained navigation scheme obtained through the processing at step S24 is within the railway design standard, in other words, the movement locus data satisfies the railway design standard (Yes at step S27), the arithmetic processing unit 27 corrects the GNSS position measurement result with the position measurement result by the self-contained navigation scheme (step S28), and employs the corrected result as the GNSS position measurement result (step S29).

Specific correction methods are as follows: the position measurement result by the self-contained navigation scheme is employed as a position measurement result in place of the GNSS position measurement result in an interval in which the GNSS position measurement result does not satisfy the railway design standard; the simple average of both position measurement results is employed as a position measurement result; and a weighted average obtained by weighting each position measurement result based on the magnitude of the difference from the railway design standard is employed as a position measurement result.

As described above, according to the present embodiment, when the obtained GNSS position measurement result does not satisfy a predetermined railway design standard, the position measurement result is corrected with the position measurement result by the self-contained navigation scheme, thereby improving the accuracy of the position measurement result. Accordingly, the train position can be more accurately specified.

2. Modification of Embodiment

In the above-described embodiment, each time the GNSS position measurement result does not satisfy a predetermined railway design standard, the position measurement result is corrected with the position measurement result by the self-contained navigation scheme. However, since the railway track is installed at a predetermined position, it is basically highly likely that the GNSS position measurement result does not satisfy the predetermined railway design standard each time at the same place.

Thus, when it is determined from a past correction history that the train travels on a place where the position measurement result was corrected with the position measurement result by the self-contained navigation scheme, it may be detected that the place is reached based on a past train travel history, and the position measurement result at this place may be corrected with the position measurement result by the self-contained navigation scheme.

In the above-described embodiment, the gauge is not considered. However, when an identical vehicle travels through an interval in which the gauge is changed, the railway design standard differs with the gauge.

Thus, railway design standards corresponding to a plurality of gauges may be stored in the railway design standard database 28 in advance, a railway design standard to be referred to may be changed when it is detected that the vehicle 11 has moved into the interval in which the gauge is changed, based on the GNSS position measurement result or a result obtained by correcting the GNSS position measurement result with the position measurement result by the self-contained navigation scheme, and processing may be performed in a similar manner in accordance with the corresponding railway design standard of the gauge.

With this configuration, when the gauge differs halfway through a travel interval, the GNSS position measurement result can be appropriately corrected with the position measurement result by the self-contained navigation scheme, thereby improving the accuracy of the position measurement result. Accordingly, the train position can be more accurately specified.

The train position detection system 10 (the train position detection apparatus 16 thereof) has a hardware configuration using a normal computer including a control device such as an MPU, and a storage device such as a read only memory (ROM) or a random access memory (RAM).

A computer program executed by the train position detection apparatus according to the present embodiment may be recorded and provided as a file in an installable or executable format in a computer-readable recording medium such as a CD-ROM, a semiconductor memory device such as a USB memory, a flexible disk (FD), a CD-R, or a digital versatile disc (DVD).

The computer program executed by the train position detection apparatus according to the present embodiment may be stored on a computer connected with a network such as the Internet and may be provided by downloading through the network. The computer program executed by the train position detection apparatus according to the present embodiment may be provided or distributed through a network such as the Internet.

The computer program of the train position detection apparatus according to the present embodiment may be incorporated in a ROM or the like in advance and provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A train position detection apparatus that detects a position of a train by receiving positioning radio waves from satellites through a reception antenna, the train position detection apparatus comprising:
    a memory that stores therein in advance a railway design standard of a railway track on which the train travels; and
    one or more hardware processors that detect a position of the train by self-contained navigation based on an input signal from a self-contained navigation sensor,
    wherein, when a result of the train position detection based on the positioning radio waves does not satisfy the railway design standard, the one or more hardware processors correct the result of the train position detection based on the positioning radio waves with a result of the position detection by self-contained navigation.

2. The train position detection apparatus according to claim 1, wherein, when the result of the position detection by self-contained navigation satisfies the railway design standard while the result of the train position detection does not satisfy the railway design standard, the one or more hardware processors correct the result of the train position detection based on the positioning radio waves with the result of the position detection by self-contained navigation.

3. The train position detection apparatus according to claim 1, wherein the one or more hardware processors refer to the railway design standard corresponding to the speed of the train.

4. The train position detection apparatus according to claim 1, wherein the one or more hardware processors detect that, based on a past train travel history, the result of the train position detection indicates reaching a place where the railway design standard is not satisfied, and the one or more hardware processors correct a position measurement result by using a result of position measurement by a self-contained navigation scheme at the place.

5. The train position detection apparatus according to claim 1, wherein the input signal from the self-contained navigation sensor includes a direction signal, an acceleration signal, an azimuth signal, or a posture signal.

6. A method executed by a train position detection apparatus configured to detect a position of a train, the method comprising:
    storing in a memory in advance a railway design standard of a railway track on which the train travels;
    detecting a position of the train by receiving positioning radio waves from satellites through a reception antenna;
    detecting a position of the train by self-contained navigation based on an input signal from a self-contained navigation sensor; and
    correcting, when a result of the train position detection based on the positioning radio waves does not satisfy the railway design standard, the result of the train position detection based on the positioning radio waves with a result of the position detection by self-contained navigation.

* * * * *